United States Patent
Nakashima et al.

(10) Patent No.: US 11,897,971 B2
(45) Date of Patent: Feb. 13, 2024

(54) MODIFIED NATURAL RUBBER, RUBBER COMPOSITION USING SAME, AND METHOD FOR PRODUCING MODIFIED NATURAL RUBBER

(71) Applicant: Toyo Tire Corporation, Itami (JP)

(72) Inventors: Daiki Nakashima, Itami (JP); Pranee Phinyocheep, Bangkok (TH)

(73) Assignee: Toyo Tire Corporation, Itami (JP)

( * ) Notice: Subject to any disclaimer, the term of this patent is extended or adjusted under 35 U.S.C. 154(b) by 538 days.

(21) Appl. No.: 17/253,292

(22) PCT Filed: Oct. 28, 2019

(86) PCT No.: PCT/JP2019/042156
§ 371 (c)(1),
(2) Date: Dec. 17, 2020

(87) PCT Pub. No.: WO2020/105371
PCT Pub. Date: May 28, 2020

(65) Prior Publication Data
US 2021/0269557 A1    Sep. 2, 2021

(30) Foreign Application Priority Data

Nov. 19, 2018    (JP) ................. 2018-216854

(51) Int. Cl.
*C08C 19/22*    (2006.01)
*C08K 3/013*    (2018.01)
*B60C 1/00*    (2006.01)

(52) U.S. Cl.
CPC ............ *C08C 19/22* (2013.01); *B60C 1/0016* (2013.01); *B60C 1/0025* (2013.01); *C08K 3/013* (2018.01)

(58) Field of Classification Search
CPC ....... C08C 19/22; C08K 3/013; B60C 1/0016; B60C 1/0025

USPC ........................................................... 524/572
See application file for complete search history.

(56) References Cited

U.S. PATENT DOCUMENTS

2011/0003911 A1    1/2011    Yonemoto

FOREIGN PATENT DOCUMENTS

| JP | 2011-89066 A | | 5/2011 |
| JP | 2011089066 A | * | 5/2011 |
| JP | 2011-195802 A | | 10/2011 |
| JP | 2012-51969 A | | 3/2012 |
| JP | 2012-140512 A | | 7/2012 |
| JP | 2013-163759 A | | 8/2013 |
| JP | 2018-123260 A | | 8/2018 |
| JP | 2018123260 A | * | 8/2018 |
| WO | 2009/104555 A1 | | 8/2009 |

OTHER PUBLICATIONS

International Search Report dated Jan. 28, 2020, issued in counterpart application No. PCT/JP2019/042156 (2 pages).

* cited by examiner

*Primary Examiner* — Kelechi C Egwim
(74) *Attorney, Agent, or Firm* — WHDA, LLP

(57) ABSTRACT

A modified natural rubber includes a linking structure represented by general formula (C), the linking structure having been formed by allowing polyisoprene, having a structure represented by general formula (A) and/or general formula (B), to bind in the structure to an amino compound having two or more primary amino groups. In the formulae (A) and (B), X represents a hydrogen atom or a methyl group, and Ps represent a polyisoprene unit. In the formula (C), W represents a residue of the amino compound from which amino end groups are removed, and Q represents at least one selected from the group consisting of general formulae (Q-1) to (Q-4), and m represents 2 to 4. In the general formulae (Q-1) to (Q-4), $*^1$ indicates binding to a carbon atom of a polyisoprene unit, and $*^2$ indicates binding to a carbon atom of the residue represented by W.

12 Claims, No Drawings

MODIFIED NATURAL RUBBER, RUBBER COMPOSITION USING SAME, AND METHOD FOR PRODUCING MODIFIED NATURAL RUBBER

TECHNICAL FIELD

The present invention relates to a modified natural rubber, a rubber composition using the rubber, and a method for producing the modified natural rubber.

BACKGROUND ART

Various means for enhancing the physical properties of a rubber polymer have been studied. For example, Patent Literature 1, for the purpose of providing a rubber which can be produced at a low cost and which enhances the low loss performance and the abrasion resistance of a rubber composition containing the rubber, has proposed a modified diene rubber obtained by oxidizing a diene rubber latex, and then adding a hydrazide compound containing a polar group to the end of the molecular chain of the diene rubber.

Patent Literature 2, for the purpose of obtaining a polymer composition having excellent abrasion resistance, has proposed e.g. a conjugated diene polymer having a monomeric unit based on a conjugated diene, and a monomeric unit based on a monomer of a specific structure, having a benzene ring substituted e.g. with a nitrogen atom, at least one end of the polymer being modified with an organosilicon compound having a specific structure.

Patent Literature 3, for the purpose of enhancing the compatibility of a filler with a rubber component, has proposed a tire rubber composition containing a modified diene rubber having, in its molecule, a linking group having a specific structure, and comprising diene polymer chains linked via the linking group.

However, there is still room for improvement in the enhancement of the physical properties of a natural rubber polymer, especially in the enhancement of the low-fuel consumption performance and the tensile strength.

CITATION LIST

Patent Literature

Patent Literature 1: WO 2009/104555
Patent Literature 2: JP-A-2011-195802
Patent Literature 3: JP-A-2013-163759

SUMMARY OF THE INVENTION

Problems to be Solved by the Invention

It is therefore an object of the present invention to provide a modified natural rubber which is superior in the low-fuel consumption performance and the tensile strength to the unmodified natural rubber, a rubber composition using the modified natural rubber, and a method for producing the modified natural rubber.

Means for Solving the Problems

In order to achieve the object, the present invention provides a modified natural rubber comprising a linking structure represented by the following general formula (C), the linking structure having been formed by allowing polyisoprene, having a structure represented by the following general formula (A) and/or general formula (B), to bind in the structure to an amino compound having two or more primary amino groups:

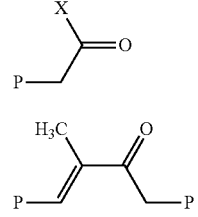

wherein X represents a hydrogen atom or a methyl group, and Ps, which may be the same or different from each other, represent a polyisoprene unit;

$$W\text{-}(Q)_m \quad (C)$$

wherein W represents the residue of the amino compound from which amino end groups are removed, and Q represents at least one selected from the group consisting of the following general formulae (Q-1) to (Q-4), and m represents 2 to 4;

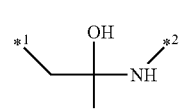

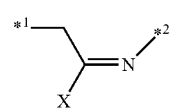

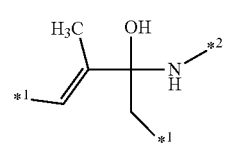

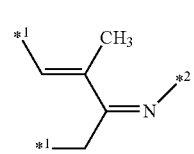

wherein $*^1$ indicates binding to a carbon atom of a polyisoprene unit, and $*^2$ indicates binding to a carbon atom of the residue represented by W.

The linking structure represented by the general formula (C) may have at least one formula selected from the group consisting of the following general formulae (C-1) to (C-10):

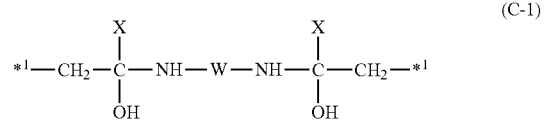

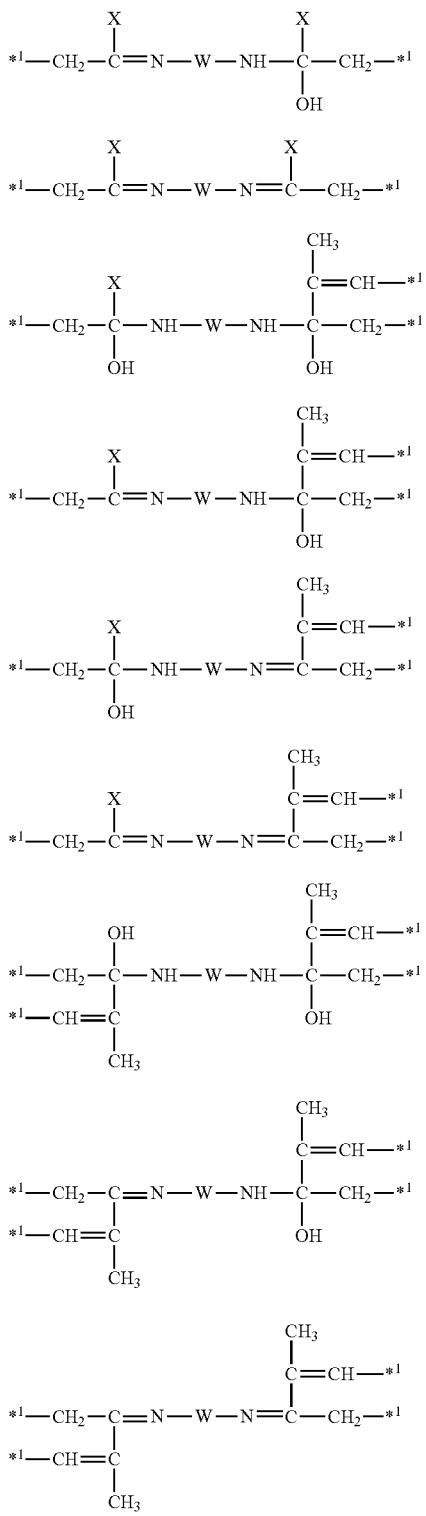

(C-2)
(C-3)
(C-4)
(C-5)
(C-6)
(C-7)
(C-8)
(C-9)
(C-10)

The modified natural rubber may have a weight average molecular weight of 1,000,000 to 2,000,000.

A rubber composition according to the present invention comprises: a rubber component containing the above-described modified natural rubber in an amount of 10 to 100 parts by mass per 100 parts by mass of the rubber component; and an inorganic filler in an amount of 10 to 150 parts by mass per 100 parts by mass of the rubber component.

A pneumatic tire according to the present invention is one produced using the rubber composition.

A method for producing a modified natural rubber according to the present invention comprises the steps of: adding an oxidizing agent to a natural rubber polymer to oxidize and cleave a carbon-carbon double bond, thereby obtaining an oxidatively decomposed natural rubber polymer; and adding an amino compound having two or more primary amino groups to the resulting oxidatively decomposed natural rubber polymer to cause the oxidatively decomposed natural rubber polymer to undergo a recombination reaction.

Advantageous Effects of the Invention

The present invention can provide a modified natural rubber which is superior in the low-fuel consumption performance and the tensile strength to the unmodified natural rubber, a rubber composition using the modified natural rubber, and a method for producing the modified natural rubber.

DESCRIPTION OF THE EMBODIMENTS

Embodiments of the present invention will now be described in detail.

A modified natural rubber according to an embodiment of the present invention comprises a linking structure represented by the following general formula (C), the linking structure having been formed by allowing polyisoprene, having a structure of the following general formula (A) and/or general formula (B), to bind in the structure to an amino compound having two or more primary amino groups:

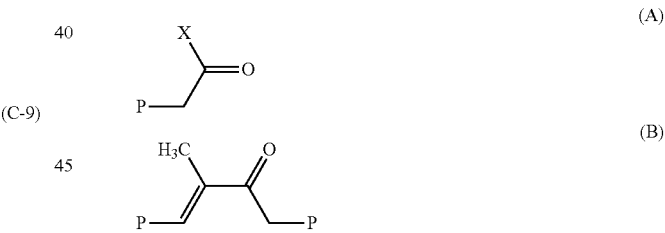

(A)

(B)

wherein X represents a hydrogen atom or a methyl group, and Ps, which may be the same or different from each other, represent a polyisoprene unit;

W-(Q)$_m$ (C)

wherein W represents the residue of the amino compound from which amino end groups are removed, and Q represents at least one selected from the group consisting of the following general formulae (Q-1) to (Q-4), and m represents 2 to 4;

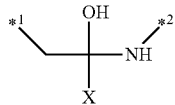

(Q-1)

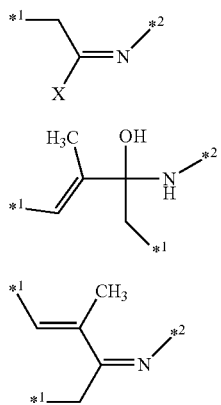

(Q-2)

(Q-3)

(Q-4)

wherein *¹ indicates binding to a carbon atom of a polyisoprene unit, and *² indicates binding to an ethylene group of W.

There is no particular limitation on a method for producing the modified natural rubber according to this embodiment. A method may be used which comprises the steps of: adding an oxidizing agent to a natural rubber polymer to oxidize and cleave a carbon-carbon double bond, thereby obtaining an oxidatively decomposed natural rubber polymer; and adding an amino compound having two or more primary amino groups to the resulting oxidatively decomposed natural rubber polymer to cause the oxidatively decomposed natural rubber polymer to undergo a recombination reaction. Thus, the modified natural rubber according to this embodiment can be obtained by decomposing a natural rubber polymer through oxidative cleavage of a carbon-carbon double bond existing in the main chain of the polymer, thereby decreasing the molecular weight, and causing a system containing the decomposed polymer to react with the amino compound, thereby recombining the polymer.

The natural rubber polymer to be modified may be one dissolved in a solvent, and it is preferred to use an aqueous emulsion in which a micellar polymer is dispersed in water which is a protic solvent, namely a latex. In the case of using an aqueous emulsion, after performing the decomposition of the rubber polymer, the amino compound can be added directly to the system to cause a recombination reaction. While there is no particular limitation on the concentration of the aqueous emulsion (the solid content concentration of the polymer), it is preferably 5 to 70% by mass, more preferably 10 to 50% by mass. If the solid content concentration is too high, the stability of the emulsion will be poor. If the solid content concentration is too low, the rate of the reaction will be unpractically low.

No particular limitation is placed on the amino compound as long as it has two or more primary amino groups. For example, it is possible to use a compound represented by the formula $NH_2(CH_2CH_2NH)_nH$, where n is preferably an integer of 1 to 4. Thus, ethylenediamine, diethylene triamine, triethylene tetraamine, and tetraethylene pentaamine can be preferably used.

The natural rubber polymer is decomposed by the above-described oxidative cleavage to obtain a polymer having a carbonyl group ($>C=O$) or a formyl group (—CHO) at the end of the molecular chain. In particular, a polymer having a structure represented by the following formula (A) at the end of the molecular chain and a polymer having a structure represented by the following formula (B) in the molecular chain are produced. As used herein, polyisoprene unit refers to polyisoprene derived from a natural rubber, in particular to cis-1,4-polyisoprene.

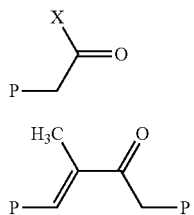

(A)

(B)

In the formula (A), X represents a hydrogen atom or a methyl group. When an isoprene unit is cleaved, X is a methyl group at one cleaved end, and is a hydrogen atom at the other cleaved end.

An oxidizing agent can be used to oxidize and cleavage a carbon-carbon double bond of the natural rubber polymer. For example, a carbon-carbon double bond can be oxidized and cleaved by adding an oxidizing agent to an aqueous emulsion of the natural rubber polymer and stirring the aqueous emulsion. Examples of the oxidizing agent include a manganese compound such as potassium permanganate or manganese oxide, a chromium compound such as chromic acid or chromium trioxide, a peroxide such as hydrogen peroxide, a perhalogenic acid such as periodic acid, and an oxygen species such as ozone or oxygen. Among them, periodic acid is preferably used. A metallic oxidation catalyst, e.g., a chloride of a metal such as cobalt, copper or iron, or a salt or complex of such a metal with an organic compound, may be used together with the oxidizing agent. For example, the natural rubber polymer may be air-oxidized in the presence of the metallic oxidation catalyst.

The molecular weight of the natural rubber polymer decreases through its decomposition by the oxidative cleavage. While there is no particular limitation on the weight average molecular weight of the polymer after decomposition, it is preferably 900 to 500,000, more preferably 5,000 to 100,000, and even more preferably 10,000 to 50,000. The amount of functional groups after recombination can be adjusted by the molecular weight of the polymer after decomposition. When the molecular weight of the polymer at decomposition is too low, a binding reaction is likely to occur in the same molecule. The weight average molecular weight as used herein refers to a weight average molecular weight value as measured by gel permeation chromatography (GPC) and calculated in terms of polystyrene.

After decomposing the polymer in the above-described manner, the reaction system containing the decomposed polymer is reacted with the amino compound to recombine the polymer. After completion of the recombination reaction, the aqueous emulsion is coagulated and dried to obtain a modified natural rubber which is solid at room temperature. A linking structure represented by the above formula (C) is introduced by the recombination reaction into the main chain of the modified natural rubber thus obtained, whereby the main chain structure is modified.

In particular, a primary amino group of the amino compound undergoes a nucleophilic addition reaction with a carbonyl group or a formyl group in the structure represented by the general formula (A) to form a linking structure represented by the general formula (Q-1). When a dehydration reaction then occurs, the linking structure changes to a linking structure represented by the general formula (Q-2). A primary amino group of the amino compound undergoes a nucleophilic addition reaction with a carbonyl group in the structure represented by the general formula (B) to form a linking structure represented by the general formula (Q-3). When a dehydration reaction then occurs, the linking structure changes to a linking structure represented by the general formula (Q-4).

Thus, the modified natural rubber of this embodiment has, in the molecule, at least one linking structure represented by the formula (C), and has a structure in which polyisoprene chains, comprising repeating isoprene units, are directly linked via the linking structure(s).

When the amino compound has two primary amino groups, the number (m) of moles of Q bound to W in the formula (C) is 2, and the linking structure represented by the formula (C) is one of those represented by the following general formulae (C-1) to (C-10). Thus, when a compound represented by $NH_2(CH_2CH_2NH)_nH$, for example, is used as the amino compound, the residue W of the amino compound in the linking structures represented by the following general formulae (C-1) to (C-10) is $-(CH_2CH_2NH)_{n-1}CH_2CH_2-$.

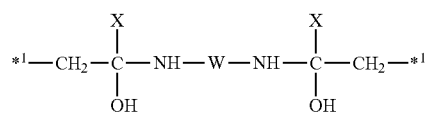
(C-1)

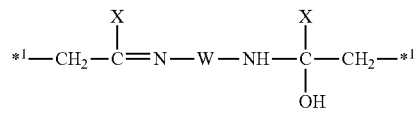
(C-2)

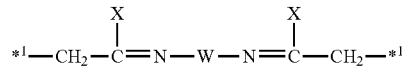
(C-3)

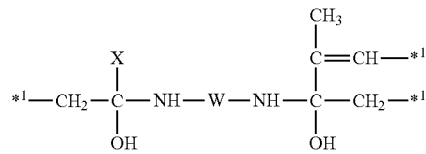
(C-4)

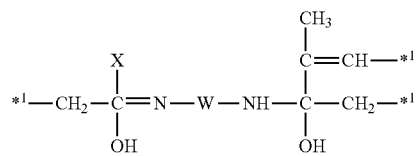
(C-5)

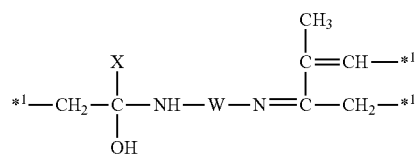
(C-6)

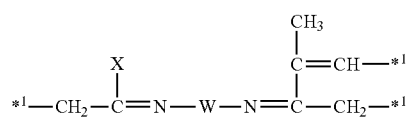
(C-7)

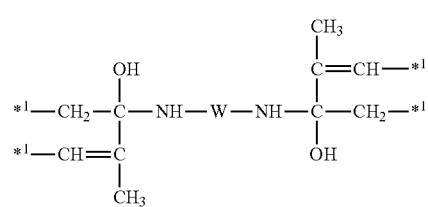
(C-8)

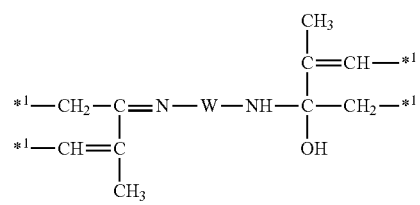
(C-9)

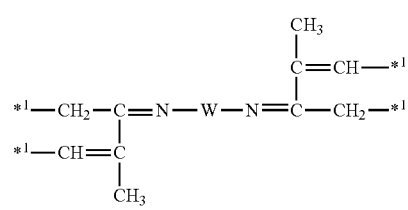
(C-10)

The linking structures represented by the general formulae (C-1) to (C-3) are formed by binding polyisoprene units, each having a structure represented by the general formula (A), via the amino compound. In particular, the linking structure represented by the general formula (C-1) corresponds to a linking structure in which the linking structures, each represented by the general formula (Q-1), are bound via the residue W of the amino compound. The linking structure represented by the general formula (C-2) corresponds to a linking structure in which the linking structure represented by the general formula (Q-1) and the linking structure represented by the general formula (Q-2) are bound via the residue W of the amino compound. The linking structure represented by the general formula (C-3) corresponds to a linking structure in which the linking structures, each represented by the general formula (Q-2), are bound via the residue W of the amino compound.

The linking structures represented by the general formulae (C-4) to (C-7) are formed by binding a polyisoprene unit having a structure represented by the general formula (A) and a polyisoprene unit having a structure represented by the general formula (B) with the amino compound. In particular, the linking structure represented by the general formula (C-4) corresponds to a linking structure in which the linking structure represented by the general formula (Q-1) and the linking structure represented by the general formula (Q-3) are bound via the residue W of the amino compound. The linking structure represented by the general formula (C-5) corresponds to a linking structure in which the linking structure represented by the general formula (Q-2) and the linking structure represented by the general formula (Q-3) are bound via the residue W of the amino compound. The linking structure represented by the general formula (C-6) corresponds to a linking structure in which the linking structure represented by the general formula (Q-1) and the linking structure represented by the general formula (Q-4) are bound via the residue W of the amino compound. The linking structure represented by the general formula (C-7) corresponds to a linking structure in which the linking structure represented by the general formula (Q-2) and the linking structure represented by the general formula (Q-4) are bound via the residue W of the amino compound.

The linking structures represented by the general formulae (C-8) to (C-10) are formed by binding polyisoprene units, each having a structure represented by the general formula (B), via the amino compound. In particular, the linking structure represented by the general formula (C-8) corresponds to a linking structure in which the linking structures, each represented by the general formula (Q-3), are bound via the residue W of the amino compound. The linking structure represented by the general formula (C-9) corresponds to a linking structure in which the linking structure represented by the general formula (Q-3) and the linking structure represented by the general formula (Q-4) are bound via the residue W of the amino compound. The linking structure represented by the general formula (C-10) corresponds to a linking structure in which the linking structures, each represented by the general formula (Q-4), are bound via the residue W of the amino compound.

While there is no particular limitation on the content of the linking structure represented by the general formula (C) (when the polymer has two or more types of linking structures, the content refers to the total content of the linking structures), it is preferably 0.1 to 1.0 mol %, more preferably 0.1 to 0.7 mol %, and even more preferably 0.1 to 0.6 mol %. As used herein, the content of the linking structure refers to the ratio of the number of moles of the linking structure to the number of moles of all the constituent units constituting the modified natural rubber, and is a value as measured by NMR. NMR spectra were measured with "Ultrashield 400 Plus", manufactured by Bruker, using TMS as a standard.

While there is no particular limitation on the weight average molecular weight of the modified natural rubber, it is preferably 800,000 to 2,000,000, more preferably 1,000,000 to 2,000,000. The recombination of the oxidatively decomposed natural rubber polymer increases the molecular weight, leading to increased entanglement of the molecular chains and increased tensile strength.

According to this embodiment, the oxidative cleavage reaction can be controlled by adjusting the type and the amount of the oxidizing agent which is an agent for cleaving a double bond, the reaction time, etc. The binding reaction can be controlled by adjusting the amount of the amino compound used for the recombination, the reaction time, etc. Such control enables control of the molecular weight of the modified natural rubber. Thus, the weight average molecular weight of the modified natural rubber can be set to be equal to that of the original polymer, or to be lower than that of the original polymer.

While there is no particular limitation on the amount of the oxidizing agent, it is preferably 0.1 to 1.0 parts by mass, more preferably 0.2 to 0.5 parts by mass per 100 parts by mass of the natural rubber polymer (solid content).

While there is no particular limitation on the amount of the amino compound, it is preferably 0.01 to 1.0 mol, more preferably 0.1 to 0.5 mol per mol of the oxidatively decomposed natural rubber polymer.

Upon the decomposition and recombination of the main chain of the polymer, the linking structure represented by the formula (C), as a structure different from the main chain, is introduced into the main chain, whereby the polymer is functionalized at a binding point between segments of the main chain structure. Since the highly-reactive structure is introduced into the main chain of the molecule, the properties of the original polymer can be changed. Thus, this embodiment does not effect grafting, direct addition or ring-opening to the natural rubber, but is to change the main chain structure itself, and can introduce a functional group into the main chain structure in a simple manner.

In particular, due to a change in interaction (intermolecular force, polarity and reactivity) between the modified natural rubber polymer and a filler, and a change in the composition of the polymer, the compatibility of the polymer with the filler or the dispersibility of the filler is enhanced, resulting in enhancement of the low-fuel consumption performance.

A rubber composition according to this embodiment may additionally contain, as a rubber component, a diene rubber other than the above-described modified natural rubber. There is no particular limitation on the type of the additional rubber. Examples may include unmodified natural rubber (NR), isoprene rubber (IR), butadiene rubber (BR), styrene-butadiene rubber (SBR), styrene-isoprene copolymer rubber, butadiene-isoprene copolymer rubber, and styrene-isoprene-butadiene copolymer rubber. These diene rubbers may be used either singly or as a mixture of two or more kinds thereof.

While there is no particular limitation on the content of the modified natural rubber in 100 parts by mass of the rubber component in the rubber composition according to this embodiment, it is preferably 10 to 100 parts by mass, more preferably 30 to 100 parts by mass, and even more preferably 50 to 100 parts by mass.

A reinforcing filler, such as carbon black or silica, can be used as an inorganic filler in the rubber composition according to this embodiment. Silica may be used either singly or in combination with carbon black. It is preferred to use a combination of carbon black and silica. While there is no particular limitation on the content of the inorganic filler, it is preferably 10 to 150 parts by mass, more preferably 20 to 100 parts by mass, and even more preferably 30 to 80 parts by mass per 100 parts by mass of the rubber component.

While there is no particular limitation on the silica, wet silica, produced by a wet precipitation method or a wet gel method, is preferably used. From the viewpoint of a balance of tan δ of the rubber, the reinforcing effect, etc., the content of silica is preferably 10 to 150 parts by mass, more preferably 15 to 100 parts by mass, and even more preferably 20 to 80 parts by mass per 100 parts by mass of the rubber component.

When the rubber composition contains silica, the rubber composition may further contain a silane coupling agent such as sulfide silane or mercaptosilane. When the rubber composition contains a silane coupling agent, its content is preferably 2 to 20 parts by mass per 100 parts by mass of silica.

There is no particular limitation on the carbon black; various known types of carbon black can be used. The content of carbon black is preferably 1 to 70 parts by mass, more preferably 1 to 30 parts by mass per 100 parts by mass of the rubber component.

In addition to the above-described components, the rubber composition according to this embodiment may further contain additives commonly used in the rubber industry, such as a process oil, zinc flower, stearic acid, a softener, a plasticizer, wax, an antioxidant, a vulcanizing agent and a vulcanization accelerator, in an appropriate amount.

Examples of the vulcanizing agent include sulfur components such as powdered sulfur, precipitated sulfur, colloidal sulfur, insoluble sulfur and highly dispersible sulfur. The content of the vulcanizing agent is preferably 0.1 to 10 parts by mass, more preferably 0.5 to 5 parts by mass per 100 parts by mass of the rubber component. The content of the vulcanization accelerator is preferably 0.1 to 7 parts by mass, more preferably 0.5 to 5 parts by mass per 100 parts by mass of the rubber component.

The rubber composition according to this embodiment can be produced by using a common mixing machine such as a Banbury mixer, a kneader or rolls.

The rubber composition obtained can be used for tires. In particular, the rubber composition can be used for pneumatic tires for various applications and having various sizes, such as tires for cars and large tires for trucks and buses, and can be applied in various portions, including a tread portion and a side wall portion, of such a tire. A pneumatic tire can be produced by molding the rubber composition into a predetermined shape by a common method such as extrusion and, after combining it with other parts, subjecting it to a vulcanization/molding process e.g. at 140 to 180° C.

There is no particular limitation on the type of a pneumatic tire according to this embodiment. As described above, the pneumatic tire can be exemplified by various types of tires including tires for cars and heavy-load tires for trucks and buses.

EXAMPLES

The following examples illustrate the present invention and are not intended to limit the scope of the invention.

The following measurements were performed on modified diene rubbers.

[Weight Average Molecular Weight (Mw)]

Mw as calculated in terms of polystyrene was determined by gel permeation chromatography (GPC). In particular, 0.2 mg of a polymer, dissolved in 1 mL of THF, was used as a measurement sample. Using "LC-20DA" manufactured by Shimadzu Corporation, the sample was passed through a filter and then passed through a column ("PL Gel 3 μm Guard×2", manufactured by Polymer Laboratories) at a temperature of 40° C. and at a flow rate of 0.7 mL/min, followed by detection with "RI Detector" manufactured by Spectra System.

[Content of Linking Structure]

The content of a linking group was measured by $^{13}$C-NMR and $^1$H-NMR. NMR spectra were measured with "Ultrashield 400 Plus", manufactured by Bruker, using TMS as a standard. 1 g of a polymer was dissolved in 5 mL of deuterated chloroform, and 87 mg of acetylacetone chromium salt was added as a relaxation reagent to the solution, and measurement was performed in a 10-mm NMR tube.

With respect to the linking structure represented by the formula (Q-1), a peak corresponding to carbon adjacent to nitrogen exists at 85 ppm in $^{13}$C-NMR. With respect to the linking structure represented by the formula (Q-2), a peak corresponding to carbon adjacent to nitrogen exists at 167 ppm in $^{13}$C-NMR. With respect to the formula (Q-3), a peak corresponding to carbon adjacent to nitrogen exists at 96 ppm in $^{13}$C-NMR. With respect to the linking structure represented by the formula (Q-4), a peak corresponding to carbon adjacent to nitrogen exists at 165 ppm in $^{13}$C-NMR. The content of each linking structure was determined from a ratio to a natural rubber polymer component for the corresponding peak (mol %).

The number of moles of the isoprene unit in a natural rubber polymer component was calculated based on the peak of carbon on the opposite side of a double bond from a methyl group and hydrogen bonded to the carbon (=CH—), namely the peak at 122 ppm in $^{13}$C-NMR and the peak at 5.2 ppm in $^1$H-NMR.

Synthesis Example 1: Synthesis of Oxidatively Decomposed Natural Rubber (Oxidatively Decomposed Natural Rubber Synthesis Step)

0.5 g of potassium persulfate and 0.34 g of trisodium phosphate were added to 100 g of a polymer in a natural rubber latex having a high ammonia content ("HA-NR" manufactured by Regitex Co., Ltd.), whose DRC (dry rubber content) had been adjusted to 30% by mass, and the latex was stirred at 30° C. for 3 hours to obtain an oxidatively decomposed natural rubber latex. The weight average molecular weight of the oxidatively decomposed natural rubber latex was 600,000.

Synthesis Example 2: Synthesis of Modified Natural Rubber 1

(Recombination Reaction Step)

8.8 g (0.147 mol) of ethylenediamine was added to 100 g (1.47 mol) of the polymer in the resulting oxidatively decomposed natural rubber latex, and the latex was stirred at 30° C. for 2 hours. Subsequently, the reaction solution was poured into methanol containing 1% of formic acid to coagulate the reaction solution. The solid matter was vacuum-dried to obtain modified natural rubber 1.

Synthesis Examples 3 to 7: Synthesis of Modified Natural Rubbers 2 to 6

Modified natural rubbers 2 to 6 were produced in the same manner as in Synthesis Example 2 except for using, instead of 8.8 of ethylenediamine, an amino compound in an amount (molar ratio to 1 mol of polymer) shown in Table 1.

Synthesis Example 8: Synthesis of Modified Natural Rubber 7

3.3 g of periodic acid ($H_5IO_6$) was added to 100 g of a polymer in a natural rubber latex having a high ammonia content ("HA-NR" manufactured by Regitex Co., Ltd.), whose DRC (dry rubber content) had been adjusted to 30% by mass, and the latex was stirred at 23° C. for 3 hours. Subsequently, 0.1 g of pyrrolidine-2-carboxylic acid as a catalyst was added to the reaction solution, and then 1N sodium hydroxide was added to the reaction solution so that its pH became 10, and the solution was stirred at 23° C. for 12 hours. Subsequently, the reaction solution was poured into methanol containing 1% of formic acid to coagulate the reaction solution. The solid matter was vacuum-dried to obtain modified natural rubber 7 (corresponding to modified diene rubber A synthesized in Synthesis Example 1 of Patent Literature 3).

TABLE 1

|  |  | Synthesis Example 1 | Synthesis Example 2 | Synthesis Example 3 | Synthesis Example 4 | Synthesis Example 5 | Synthesis Example 6 | Synthesis Example 7 | Synthesis Example 8 |
|---|---|---|---|---|---|---|---|---|---|
| Ethylenediamine (molar ratio) | | — | 0.1 | 0.25 | 0.4 | — | — | — | — |
| Triethylene tetraamine (molar ratio) | | — | — | — | — | 0.1 | 0.25 | 0.4 | — |
| Weight average molecular weight ($\times 10^4$) | | 60 | 107 | 136 | 182 | 92 | 137 | 175 | 97 |
| Content of linking Structure (mol %) | Formula (Q-1) | — | 0.10 | 0.20 | 0.38 | 0.13 | 0.30 | 0.42 | — |
| | Formula (Q-2) | — | 0.01 | 0.02 | 0.04 | 0.01 | 0.03 | 0.04 | — |
| | Formula (Q-3) | — | 0.02 | 0.05 | 0.09 | 0.03 | 0.06 | 0.07 | — |
| | Formula (Q-4) | — | 0.00 | 0.01 | 0.01 | 0.00 | 0.01 | 0.01 | — |
| Total | | — | 0.13 | 0.28 | 0.52 | 0.18 | 0.40 | 0.54 | — |

Using a Banbury mixer and following the formulations (parts by mass) shown in Table 2 below, components other than a vulcanization accelerator and sulfur were first mixed in a non-productive mixing step (discharge temperature=150° C.), and then the vulcanization accelerator and sulfur were added to the mixture and mixing of the resulting mixture was performed in a productive mixing step (discharge temperature=90° C.), thereby preparing a rubber composition.

The following are details of the components listed in Table 2.

Unmodified NR: the natural rubber latex having a high ammonia content "HA-NR", manufactured by Regitex Co., Ltd.

Modified natural rubber 1: the modified natural rubber synthesized in Synthesis Example 2

Modified natural rubber 2: the modified natural rubber synthesized in Synthesis Example 3

Modified natural rubber 3: the modified natural rubber synthesized in Synthesis Example 4

Modified natural rubber 4: the modified natural rubber synthesized in Synthesis Example 5

Modified natural rubber 5: the modified natural rubber synthesized in Synthesis Example 6

Modified natural rubber 6: the modified natural rubber synthesized in Synthesis Example 7

Modified natural rubber 7: the modified natural rubber synthesized in Synthesis Example 8

Silica: "Nipsil AQ" manufactured by Tosoh Silica Corporation (BET=200 m²/g)

Carbon black: "SEAST 3" manufactured by Tokai Carbon Co., Ltd.

Silane coupling agent: Bis(3-triethoxysilylpropyl)tetrasulfide "Si69" manufactured by Evonik Japan Co., Ltd.

Zinc flower: "Zinc Flower Type 1" manufactured by Mitsui Mining & Smelting Co., Ltd.

Process oil: "X-140" manufactured by Japan Energy Corporation

Antioxidant: "NOCRAC 6C" manufactured by Ouchi Shinko Chemical Industrial Co., Ltd.

Stearic acid: "LUNAC S-20" manufactured by Kao Corporation

Sulfur: "Powdered sulfur for rubber 150 mesh" manufactured by Hosoi Chemical Industry Co., Ltd.

Vulcanization accelerator: "NOCCELER CZ" manufactured by Ouchi Shinko Chemical Industrial Co., Ltd.

For each of the rubber compositions obtained, the low-fuel consumption performance and the tensile strength were evaluated in the following manner.

Low-fuel consumption performance: Using "Rheospectrometer E4000" manufactured by USM, a loss factor tan δ was measured under the conditions: frequency 50 Hz, static strain 10%, dynamic strain 2%, and temperature 60° C. The measured value is expressed as an index number relative to the value of Comparative Example 1 expressed as 100. The tan δ at 60° C. is generally used as an index of the low heat generation properties of a tire rubber composition. A higher index number indicates a lower tan δ, thus indicating that the rubber composition generates less heat, and therefore provides a tire having superior low-fuel consumption performance.

Tensile strength: A tensile test was performed according to JIS K 6251 (using a dumbbell-shaped No. 3 specimen) to measure a tensile strength at break. The measured value is expressed as an index number relative to the value of Comparative Example 1 expressed as 100. A higher index number indicates a higher and thus better tensile strength.

TABLE 2

| | Amount (parts by mass) | | | | | | | |
|---|---|---|---|---|---|---|---|---|
| | Comp. Ex. 1 | Ex. 1 | Ex. 2 | Ex. 3 | Ex. 4 | Ex. 5 | Ex. 6 | Comp. Ex. 2 |
| Unmodified NR | 100 | — | — | — | — | — | — | — |
| Modified natural rubber 1 (Synthesis Ex. 2) | — | 100 | — | — | — | — | — | — |
| Modified natural rubber 2 (Synthesis Ex. 3) | — | — | 100 | — | — | — | — | — |

TABLE 2-continued

| | Amount (parts by mass) | | | | | | | |
|---|---|---|---|---|---|---|---|---|
| | Comp. Ex. 1 | Ex. 1 | Ex. 2 | Ex. 3 | Ex. 4 | Ex. 5 | Ex. 6 | Comp. Ex. 2 |
| Modified natural rubber 3 (Synthesis Ex. 4) | — | — | — | 100 | — | — | — | — |
| Modified natural rubber 4 (Synthesis Ex. 5) | — | — | — | — | 100 | — | — | — |
| Modified natural rubber 5 (Synthesis Ex. 6) | — | — | — | — | — | 100 | — | — |
| Modified natural rubber 6 (Synthesis Ex. 7) | — | — | — | — | — | — | 100 | — |
| Modified natural rubber 7 (Synthesis Ex. 8) | — | — | — | — | — | — | — | 100 |
| Silica | 50 | 50 | 50 | 50 | 50 | 50 | 50 | 50 |
| Carbon black | 10 | 10 | 10 | 10 | 10 | 10 | 10 | 10 |
| Silane coupling agent | 4 | 4 | 4 | 4 | 4 | 4 | 4 | 4 |
| Zinc flower | 2 | 2 | 2 | 2 | 2 | 2 | 2 | 2 |
| Process oil | 2 | 2 | 2 | 2 | 2 | 2 | 2 | 2 |
| Antioxidant | 2 | 2 | 2 | 2 | 2 | 2 | 2 | 2 |
| Stearic acid | 2 | 2 | 2 | 2 | 2 | 2 | 2 | 2 |
| Sulfur | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 |
| Physical properties (index) | | | | | | | | |
| Low-fuel consumption performance | 100 | 104 | 105 | 105 | 102 | 106 | 110 | 102 |
| Tensile strength | 100 | 103 | 105 | 105 | 104 | 106 | 107 | 101 |

The results are shown in Table 2 above. As can be seen from comparison between Comparative Example 1 and Examples 1 to 6, the use of the modified natural rubber of the present invention can achieve excellent low-fuel consumption performance and tensile strength.

As can be seen from comparison of Comparative Example 2, which uses the modified natural rubber having a linking structure that differs from that of the present invention, with Examples 1 to 6, the use of the modified natural rubber of the present invention can achieve low-fuel consumption performance comparable or superior to that of Comparative Example 2, and can achieve tensile strength superior to that of Comparative Example 2.

INDUSTRIAL APPLICABILITY

A rubber composition using the modified natural rubber of the present invention can be used for various tires, such as tires for cars and tires for light trucks or buses.

The invention claimed is:

1. A modified natural rubber comprising a linking structure represented by the following general formula (C), the linking structure having been formed by allowing polyisoprene, having a structure represented by the following general formula (A) and/or general formula (B), to bind in the structure to an amino group of an amino compound having two or more primary amino groups:

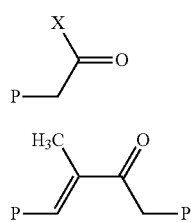

wherein X represents a hydrogen atom or a methyl group, and Ps, which may be the same or different from each other, represent a polyisoprene unit;

wherein W represents a residue of the amino compound from which amino end groups are removed, and Q represents at least one selected from the group consisting of the following general formulae (Q-1) to (Q-4), and m represents 2 to 4;

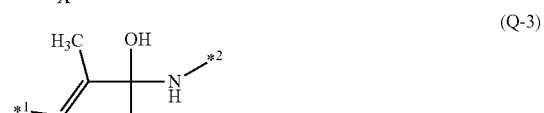

wherein *[1] indicates binding to a carbon atom of a polyisoprene unit, and *[2] indicates binding to a carbon atom of the residue represented by W.

2. The modified natural rubber according to claim 1, wherein the linking structure represented by the general formula (C) has at least one formula selected from the group consisting of the following general formulae (C-1) to (C-10):

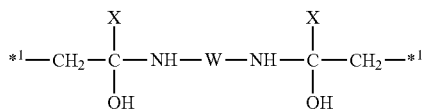
(C-1)

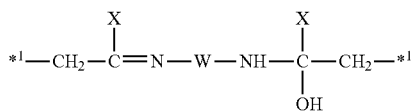
(C-2)

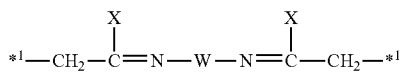
(C-3)

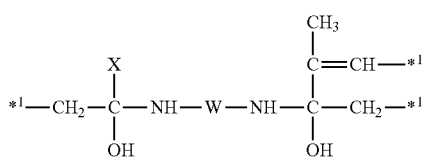
(C-4)

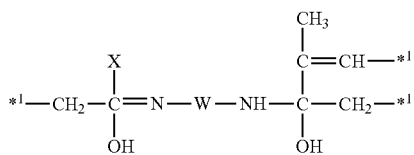
(C-5)

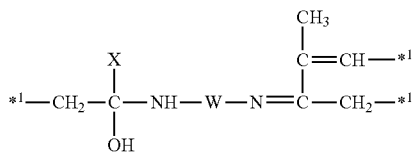
(C-6)

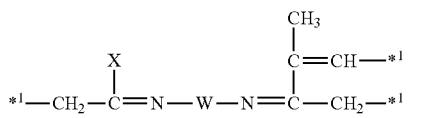
(C-7)

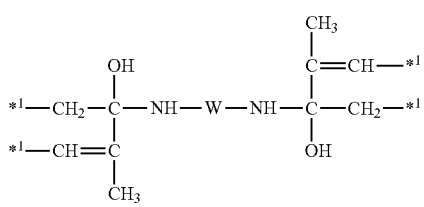
(C-8)

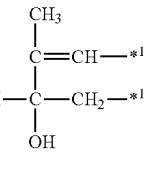
(C-9)

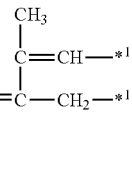
(C-10)

3. The modified natural rubber according to claim 1, having a weight average molecular weight of 1,000,000 to 2,000,000.

4. The modified natural rubber according to claim 2, having a weight average molecular weight of 1,000,000 to 2,000,000.

5. A rubber composition comprising: a rubber component containing the modified natural rubber according to claim 1 in an amount of 10 to 100 parts by mass per 100 parts by mass of the rubber component; and an inorganic filler in an amount of 10 to 150 parts by mass per 100 parts by mass of the rubber component.

6. A rubber composition comprising: a rubber component containing the modified natural rubber according to claim 2 in an amount of 10 to 100 parts by mass per 100 parts by mass of the rubber component; and an inorganic filler in an amount of 10 to 150 parts by mass per 100 parts by mass of the rubber component.

7. A rubber composition comprising: a rubber component containing the modified natural rubber according to claim 3 in an amount of 10 to 100 parts by mass per 100 parts by mass of the rubber component; and an inorganic filler in an amount of 10 to 150 parts by mass per 100 parts by mass of the rubber component.

8. A rubber composition comprising: a rubber component containing the modified natural rubber according to claim 4 in an amount of 10 to 100 parts by mass per 100 parts by mass of the rubber component; and an inorganic filler in an amount of 10 to 150 parts by mass per 100 parts by mass of the rubber component.

9. A pneumatic tire produced using the rubber composition according to claim 5.

10. A pneumatic tire produced using the rubber composition according to claim 6.

11. A pneumatic tire produced using the rubber composition according to claim 7.

12. A pneumatic tire produced using the rubber composition according to claim 8.

* * * * *